United States Patent [19]

Hamano et al.

[11] Patent Number: 5,299,064
[45] Date of Patent: Mar. 29, 1994

[54] ZOOM LENS OF REAR FOCUS TYPE

[75] Inventors: Hiroyuki Hamano, Kanagawa; Hiroshi Satoh, Tokyo, both of Japan

[73] Assignee: Canon Kabushiki Kaisha, Tokyo, Japan

[21] Appl. No.: 99,403

[22] Filed: Jul. 30, 1993

Related U.S. Application Data

[63] Continuation of Ser. No. 857,996, Mar. 26, 1992, abandoned.

[30] Foreign Application Priority Data

Mar. 29, 1991 [JP] Japan .................................. 3-065835
Mar. 26, 1992 [JP] Japan .................................. 4-068443

[51] Int. Cl.$^5$ ............................................. G02B 15/14
[52] U.S. Cl. ...................................... 359/684; 359/683
[58] Field of Search ......................... 359/676, 683, 684

[56] References Cited

U.S. PATENT DOCUMENTS

| | | | |
|---|---|---|---|
| 4,702,567 | 10/1987 | Kato et al. | 359/684 X |
| 4,842,385 | 6/1989 | Tanaka | 359/687 |
| 4,859,042 | 8/1989 | Tanaka | 359/687 |
| 4,874,231 | 10/1989 | Aono | 359/683 |
| 5,042,927 | 8/1991 | Ogawa et al. | 359/683 O |
| 5,126,883 | 6/1992 | Sato et al. | 359/683 |
| 5,202,922 | 4/1993 | Banno et al. | 359/676 |

FOREIGN PATENT DOCUMENTS

| | | |
|---|---|---|
| 0405856A3 | 6/1990 | European Pat. Off. . |
| 606914 | 1/1983 | Japan . |
| 58-129404 | 8/1983 | Japan . |
| 58-160913 | 9/1983 | Japan . |
| 61-004013 | 1/1986 | Japan . |
| 61-258217 | 11/1986 | Japan . |
| 63-247316 | 10/1988 | Japan . |

*Primary Examiner*—Scott J. Sugarman
*Attorney, Agent, or Firm*—Fitzpatrick, Cella, Harper & Scinto

[57] ABSTRACT

A zoom lens of the rear focus type is disclosed, comprising, in the order from the object side, a first lens unit having a positive refractive power, a second lens unit having a negative refractive power, a third lens unit having a positive refractive power, a fourth lens unit having a positive refractive power, and a fifth lens unit having a negative refractive power, wherein zooming is performed by moving the second and fourth lens units, and focusing is performed by moving the fourth lens unit.

12 Claims, 12 Drawing Sheets

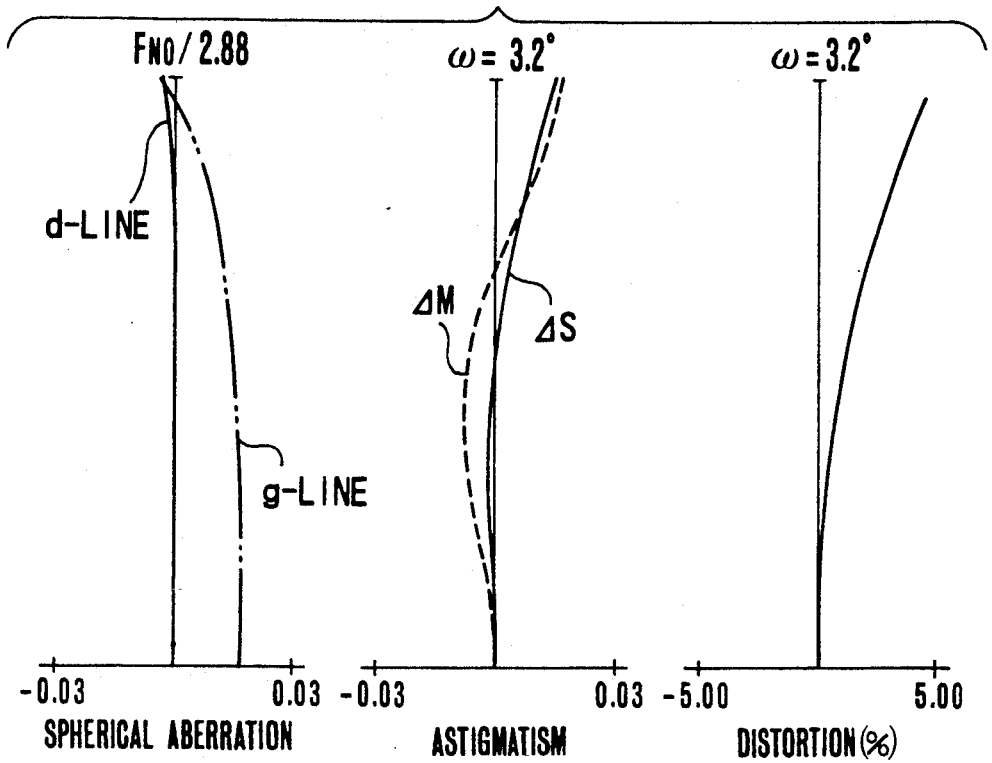
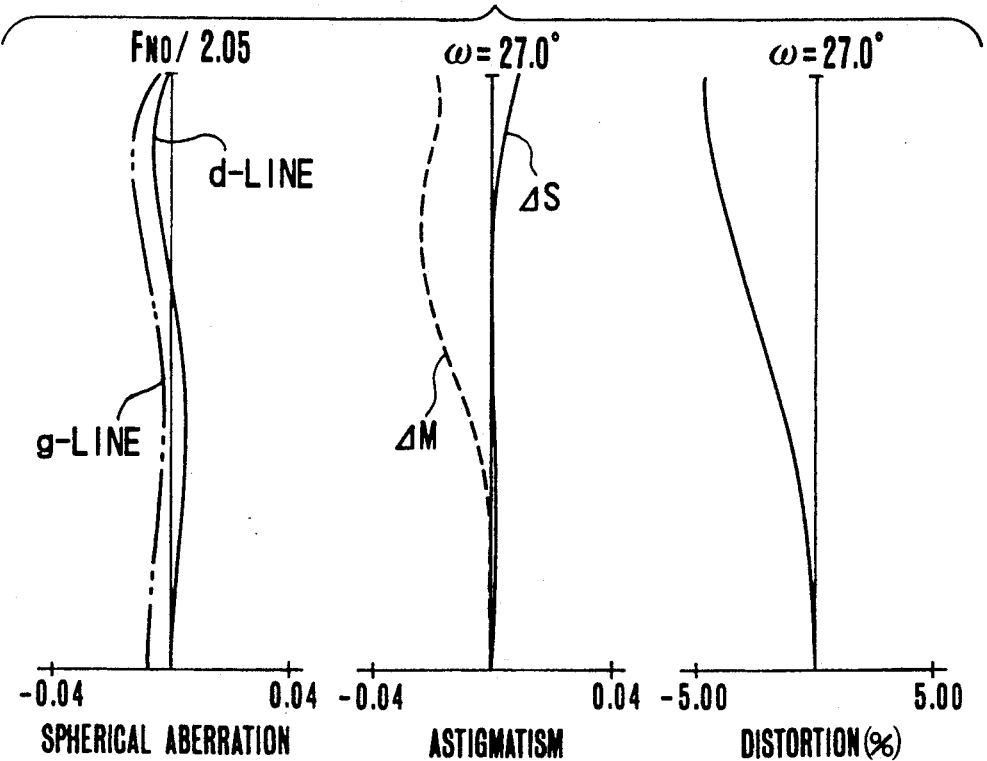

ZOOM LENS OF REAR FOCUS TYPE

This application is a continuation of application Ser. No. 07/857,996 filed Mar. 26, 1992 now abandoned.

BACKGROUND OF THE INVENTION

1. Field of he Invention

This invention relates to zoom lenses of the rear focus type and, more particularly, zoom lenses of the rear focus type for use in photographic cameras or video cameras. Still more particularly, it relates to zoom lenses of the rear focus type having a high range of about 8 to 10 and a large aperture ratio of about F2 in F-number at full open aperture, while nevertheless maintaining a minimization of the bulk and size to be achieved.

2. Description of the Related Art

In the field of cameras for photography and video cameras, a wide variety of zoom lenses having the focusing provision made in other than the first lens unit when counted from the object side, i.e., the so-called rear focus type, have been proposed.

The zoom lenses of the rear focus type have generally advantages over the type of zoom lenses having the focusing provision at the first lens unit, in that the effective diameter of the first lens unit gets smaller, that it becomes easier to minimize the size of the entirety, also that close-up photography, particularly photomacrography, becomes easy to perform, and further that, since the lens unit to be moved is of relatively small size and light weight, because a small power for driving that lens unit is sufficient, rapid focusing can be performed.

A zoom lens of the rear focus type having such advantages is disclosed in, for example, Japanese Laid-Open Patent Application No. Sho 62-247316, where a positive first lens unit, a negative second lens unit, a positive third lens unit and a positive fourth lens unit are arranged on a common optical axis in this order from the object side, the second lens unit being moved to vary the focal length, while the fourth lens unit is moved to compensate for the image shift with zooming and to perform focusing.

In Japanese Laid-Open Patent Application No. Sho 58-160913, a zoom lens has four lens units, of which the first is of positive refractive power, the second is of negative refractive power, the third is of positive refractive power and the fourth is of positive refractive power, the first and second lens units being moved to vary the focal length, while the fourth lens unit is moved to compensate for the image shift with zooming. Among these lens units, one or two or more lens units are moved to perform focusing.

Yet another Japanese Laid-Open Patent Applications Nos. Sho 58-129404 and Sho 61-258217 disclose zoom lenses comprising, from the object side, a positive first lens unit, a negative second lens unit, a positive third lens unit, a positive fourth lens unit and a negative fifth lens unit, wherein the fifth lens unit or a plurality of lens units including the fifth lens unit is or are moved to effect focusing. Another Japanese Laid-Open Patent Application No. Sho 60-6914 discloses a zoom lens of a similar refractive power arrangement to that described above, wherein for a specific infinite object distance, the focusing lens unit takes a constant position on the optical axis independently of zooming.

The use of the rear focusing method in the zoom lens produces, in general case, advantages of getting a lens system of minimized size as a whole and of making it possible to increase the focusing speed, and further of making it easy to extend the focusing range toward the shorter object distances, as have been described before.

On the other hand, however, the range of variation of aberrations with focusing expands, giving rise to a very difficult problem of obtaining a high optical performance throughout a focusing range from infinity to the minimum object distance, while still permitting the bulk and size of the entire lens system to be minimized.

Particularly with the large relative aperture ratio and the high zoom ratio, the problem of obtaining the high optical performance throughout the entire zooming range as well as the entire focusing range becomes very serious.

SUMMARY OF THE INVENTION

An object of the invention is to increase the relative aperture and the range at once by employing the rear focusing method, and to provide a zoom lens of the rear focus type in simple form having good stability of optical performance throughout the entire extended zooming range and throughout the entire focusing range without involving any more increase of the bulk and size of the entire lens system.

One of the features of the invention is that a zoom lens is constructed as comprising, in the order from the object side, a irs lens unit having a positive refractive power, a second lens unit having a negative refractive power, a third lens unit having a positive refractive power, a fourth lens unit having a positive refractive power power, and a fifth lens unit having a negative refractive power, wherein zooming is performed by moving the second and fourth lens units and focusing is performed by moving the fourth lens unit.

BRIEF DESCRIPTION OF THE DRAWINGS

FIG. 11 is graphic representations of the various aberrations of the zoom lens shown in the numerical example 3 in the telephoto end.

FIG. 12 is graphic representations of the various aberrations of a zoom lens, which is shown in a numerical example 4, in the wide-angle end.

DETAILED DESCRIPTION OF THE PREFERRED EMBODIMENTS

Figure 1:
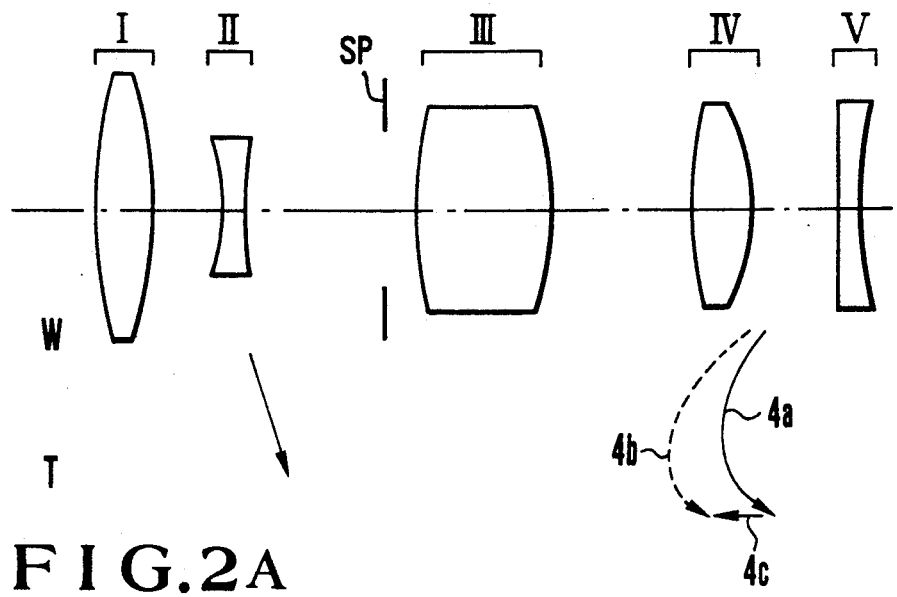
FIG. 1 is a block diagram of a zoom lens concerning the present invention with its paraxial power arrangement and the loci of zooming and focusing movements illustrated.
Figure 2A:
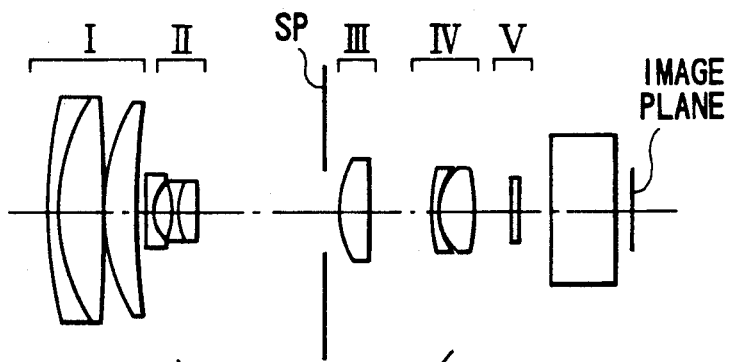
FIGS. 2A and 2B are longitudinal section views of a numerical example 1 of a specific zoom lens of the invention.
Figure 2B:
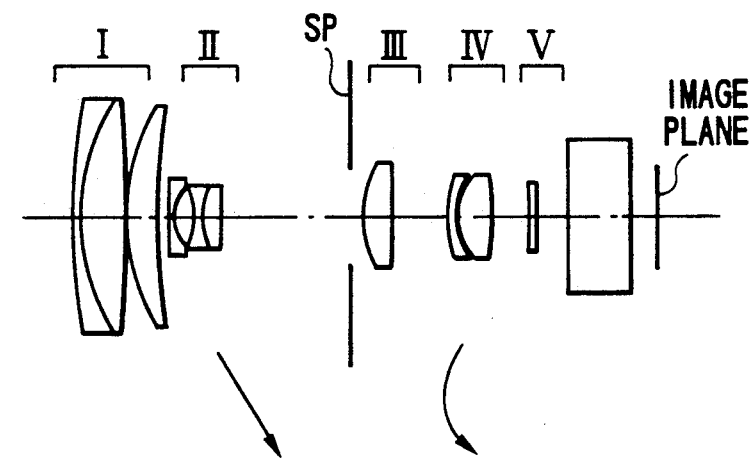
Figure 3:
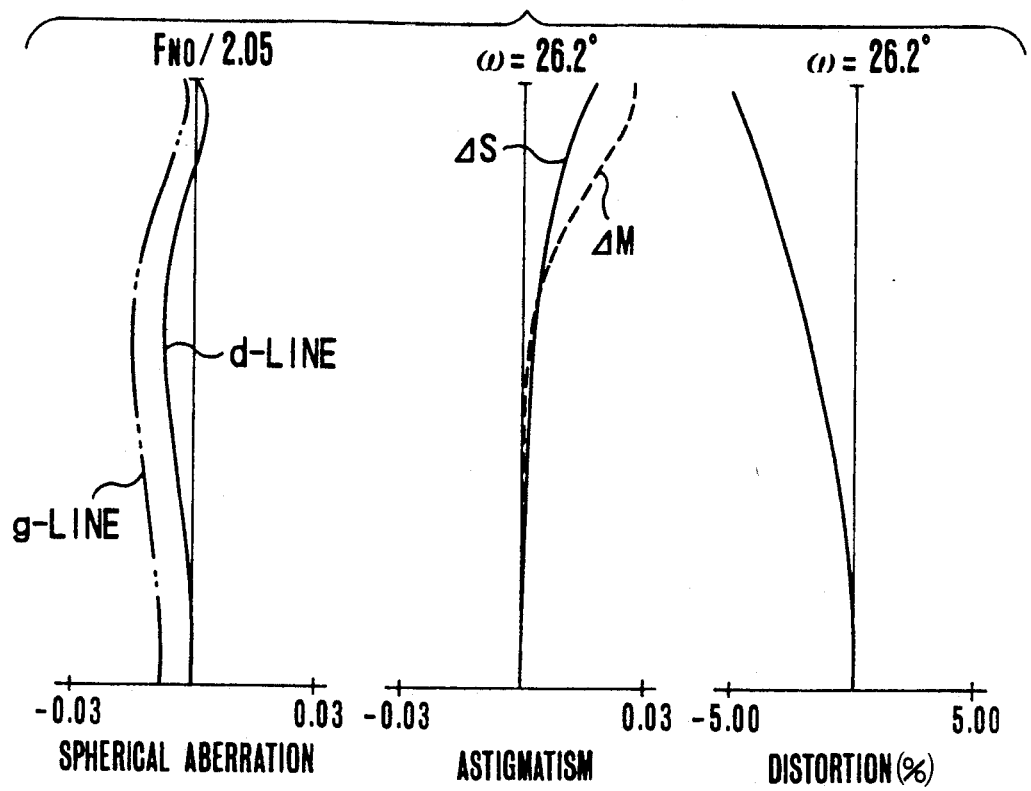
FIGS. 3 is graphic representations of the various aberrations of the zoom lens shown in the numerical example 1 in the wide-angle end.
Figure 4:
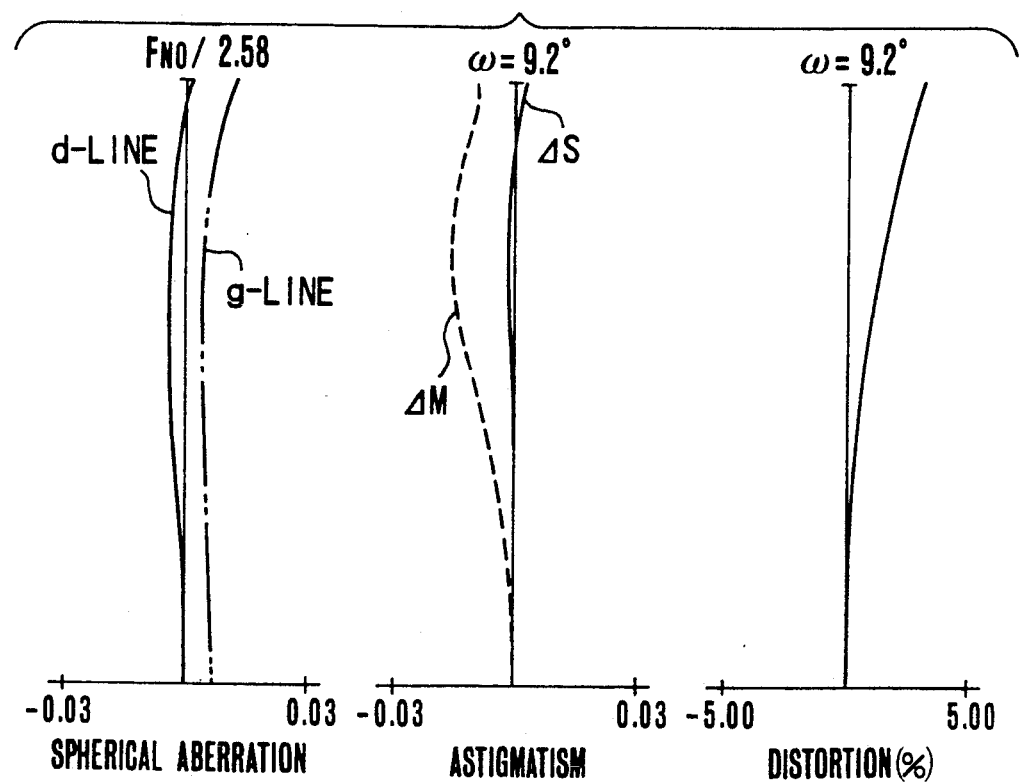
FIG. 4 is graphic representations of the various aberrations of the zoom lens shown in the numerical example 1 in an intermediate focal length position.
Figure 5:
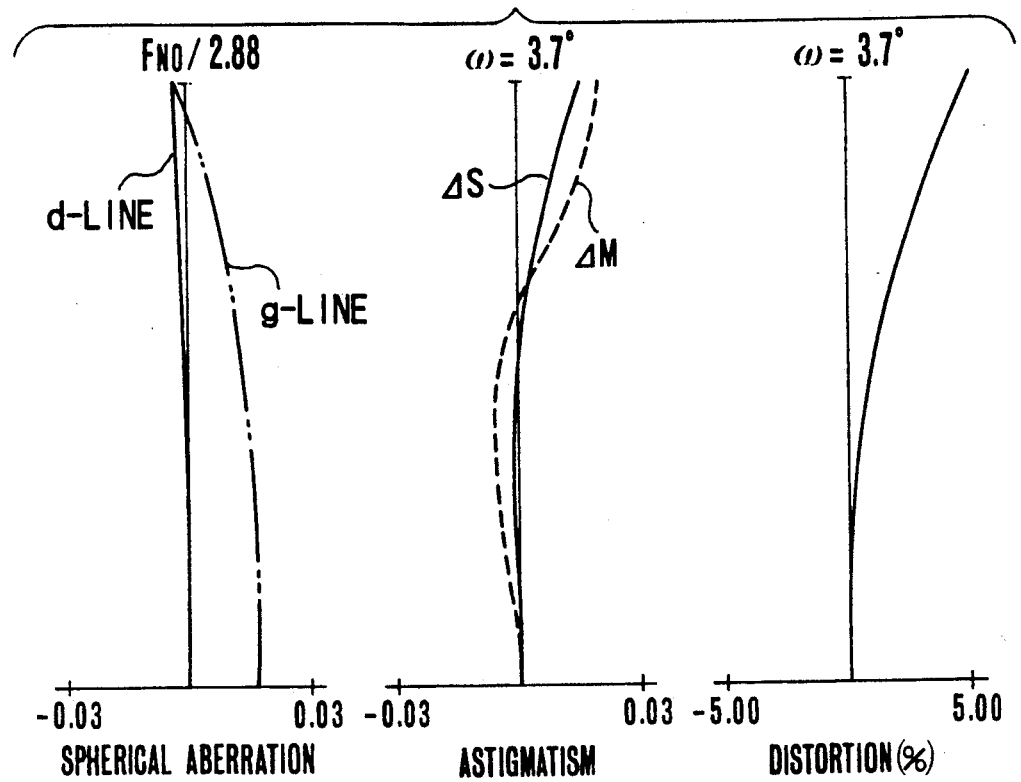
FIG. 5 is graphic representations of the various aberrations of the zoom lens shown in the numerical example 1 in the telephoto end.
Figure 6:
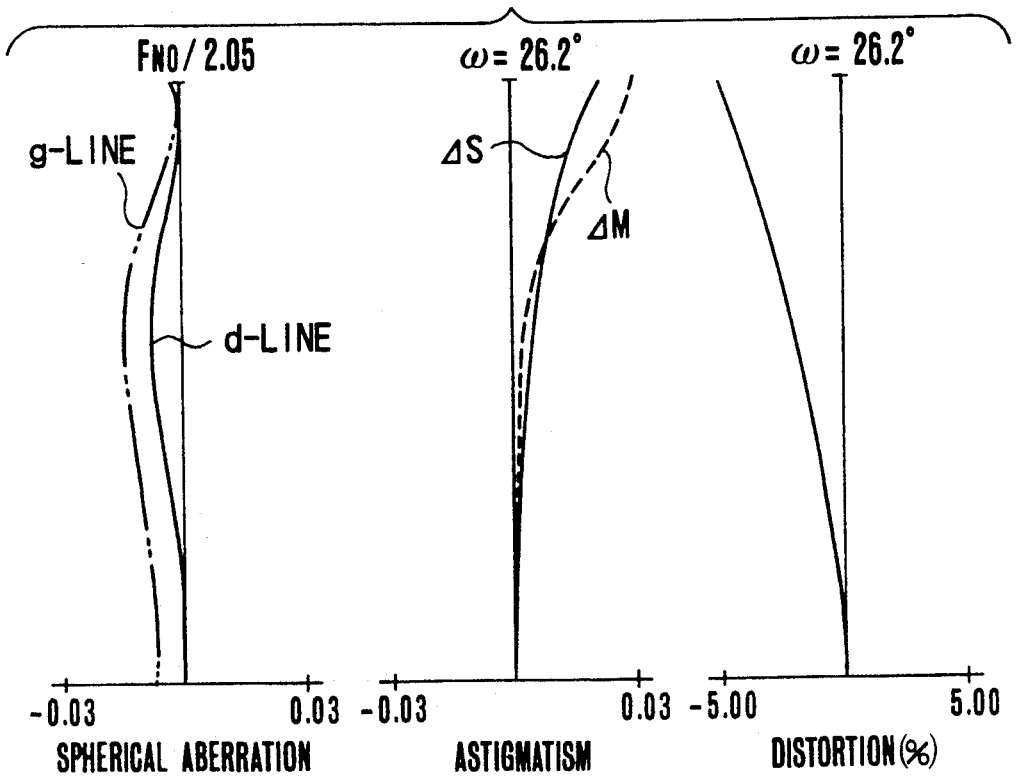
FIG. 6 is graphic representations of the various aberrations of another zoom lens, which is shown in a numerical example 2, in the wide-angle end.
Figure 7:
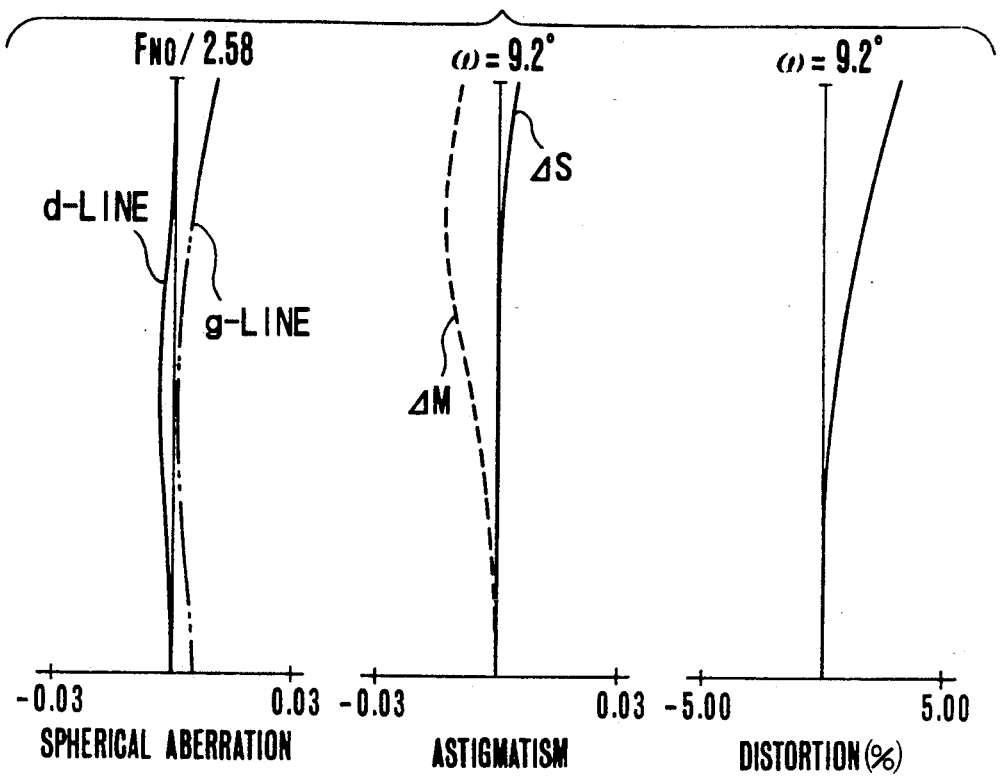
FIG. 7 is graphic representations of the various aberrations of the zoom lens shown in the numerical example 2 in an intermediate focal length position.
Figure 8:
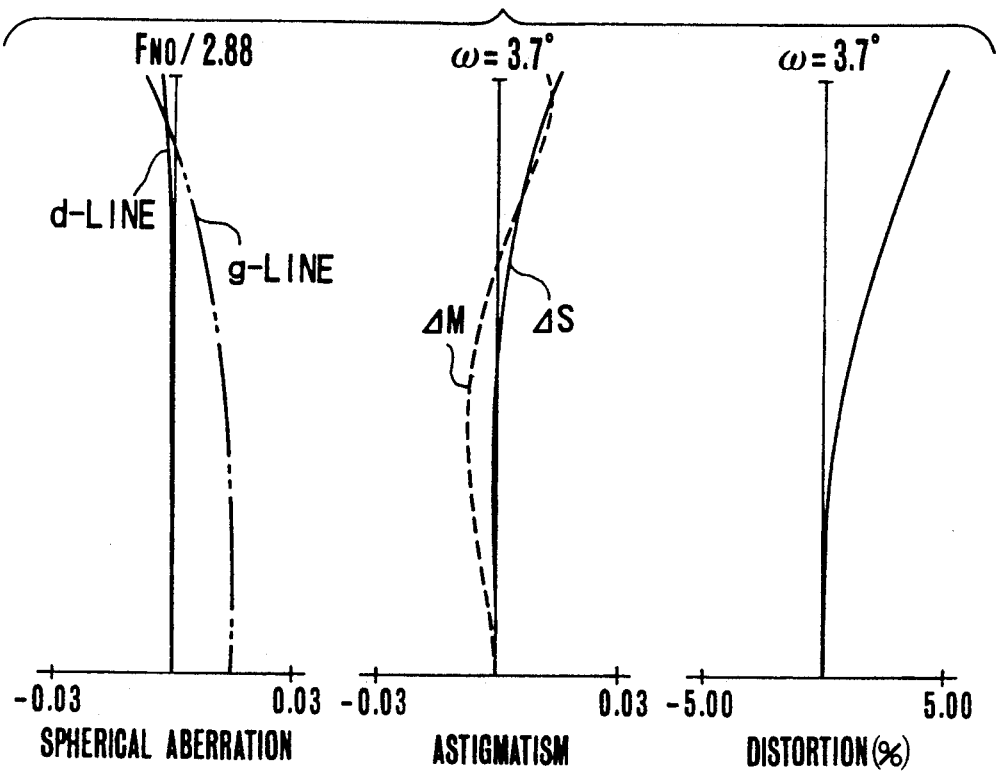
FIG. 8 is graphic representations of the various aberrations of the zoom lens shown in the numerical example 2 in the telephoto end.
Figure 9:
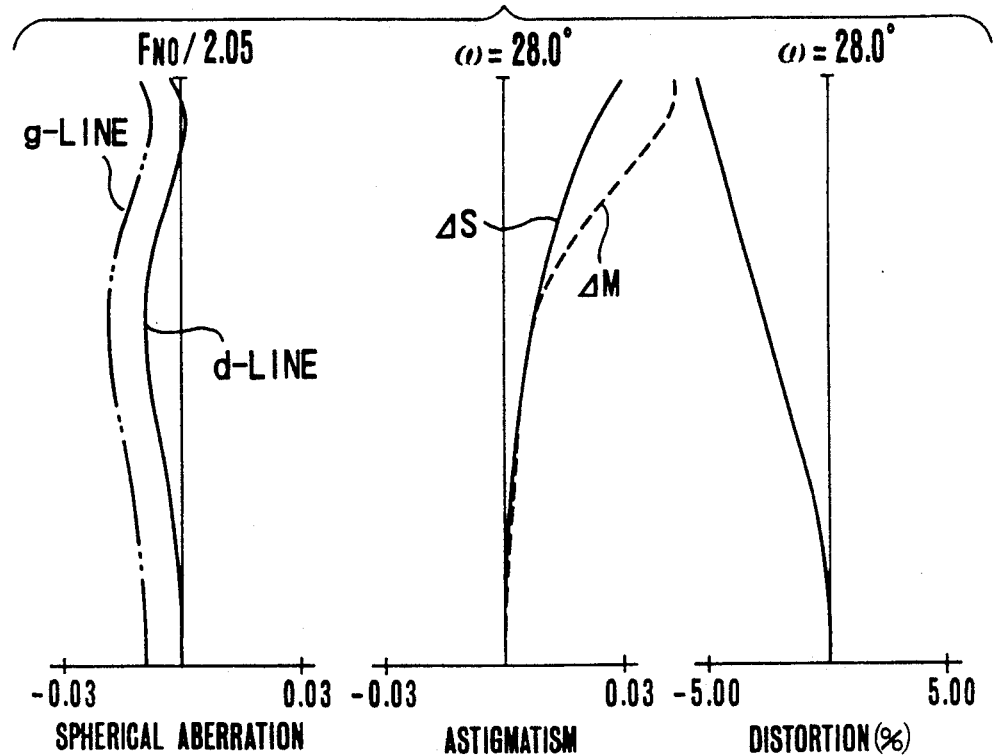
FIG. 9 is graphic representations of the various aberrations of another zoom lens, which is shown in a numerical example 3, in the wide-angle end.
Figure 10:
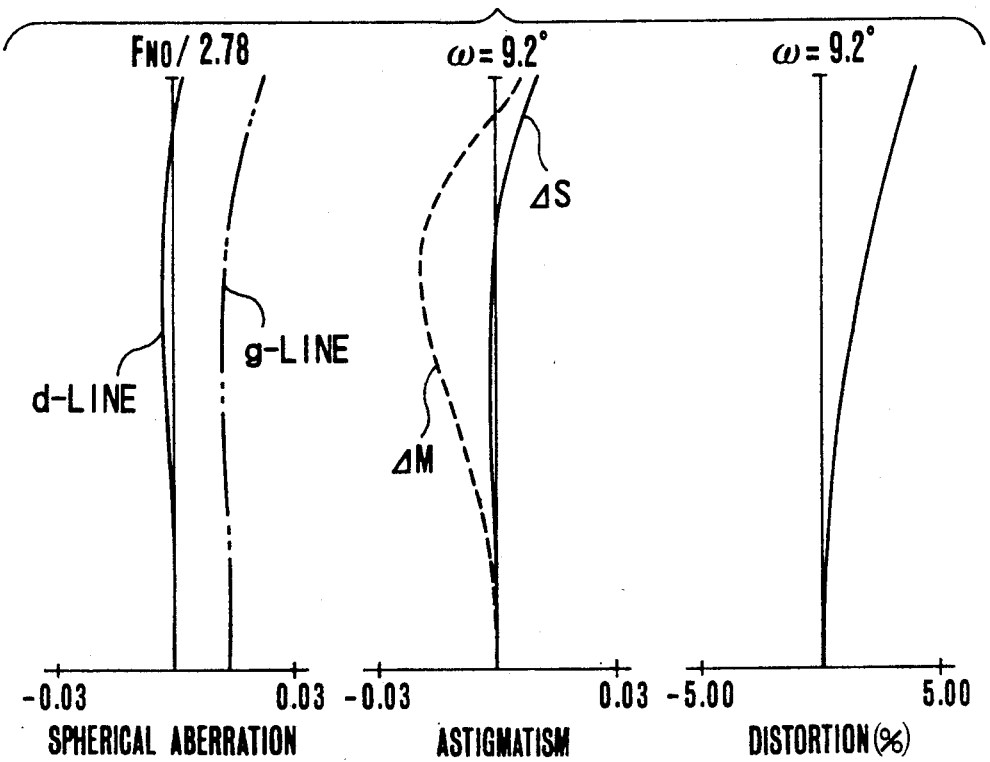
FIG. 10 is graphic representations of the various aberrations of the zoom lens shown in the numerical example 3 in an intermediate focal length position.
Figure 13:
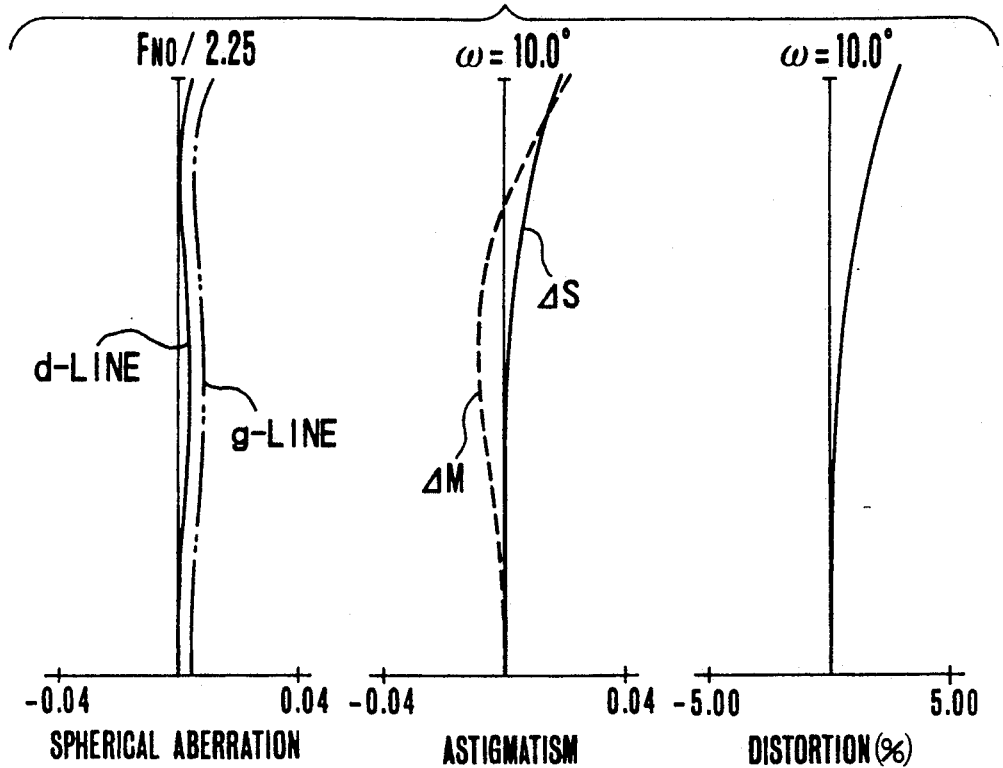
FIG. 13 is graphic representations of the various aberrations of the zoom lens shown in the numerical example 4 in an intermediate focal length position.
Figure 14:
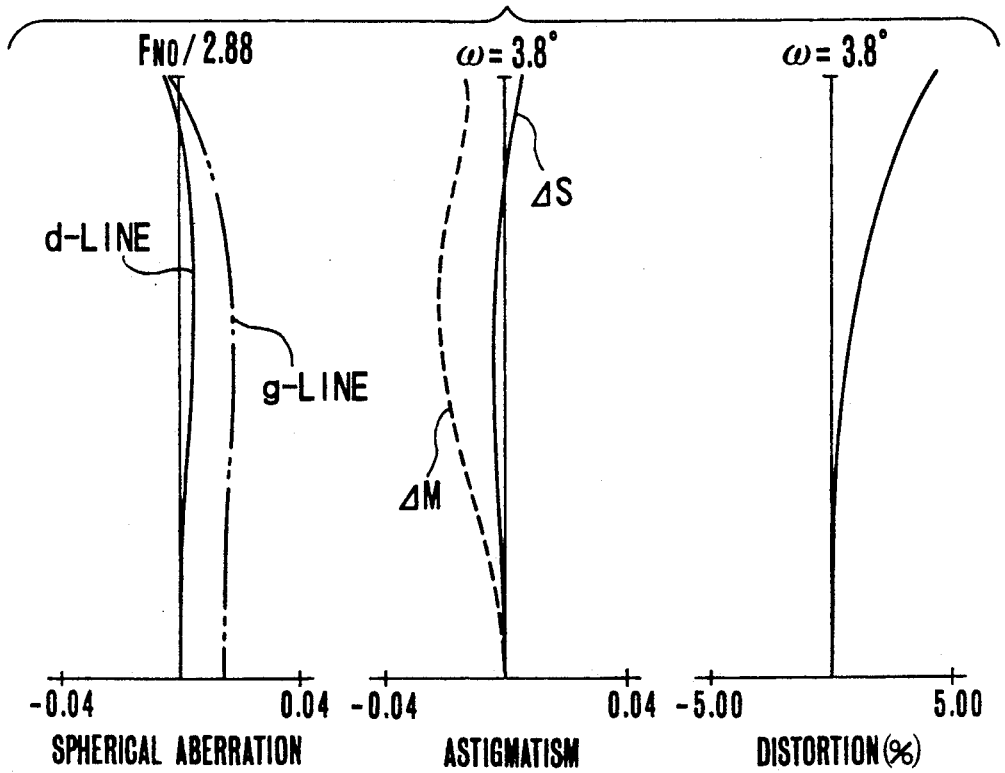
FIG. 14 is graphic representations of the various aberrations of the zoom lens shown in the numerical example 4 in the telephoto end.
Figure 15:
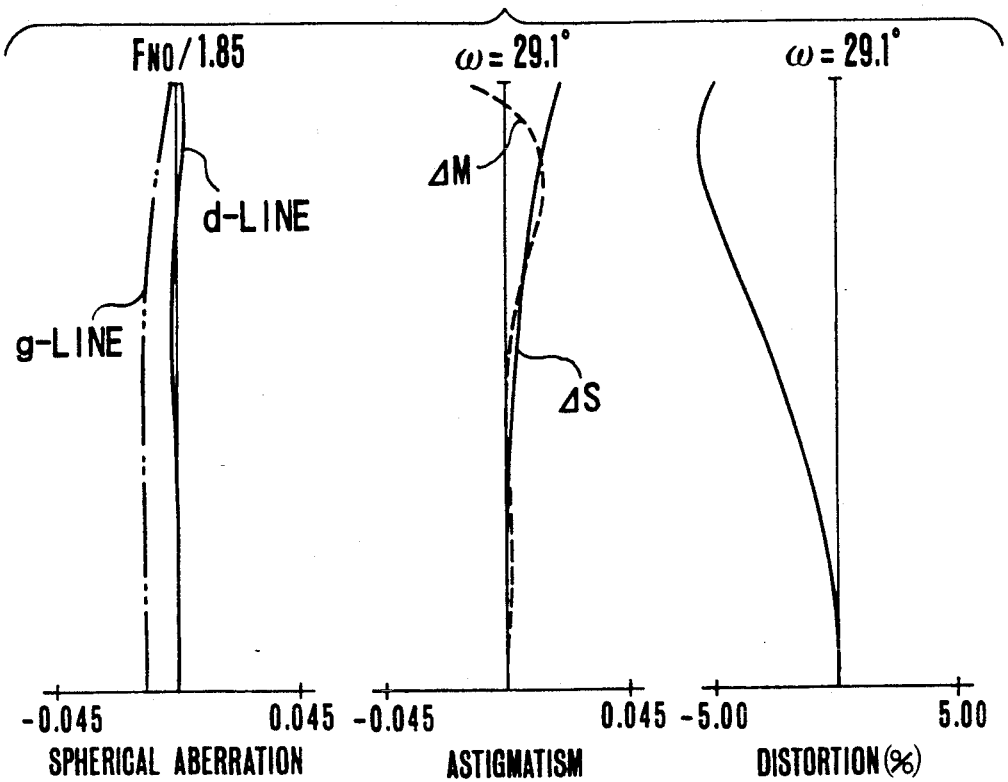
FIG. 15 is graphic representations of the various aberrations of a zoom lens, which is shown in a numerical example 5, in the wide-angle end.
Figure 16:
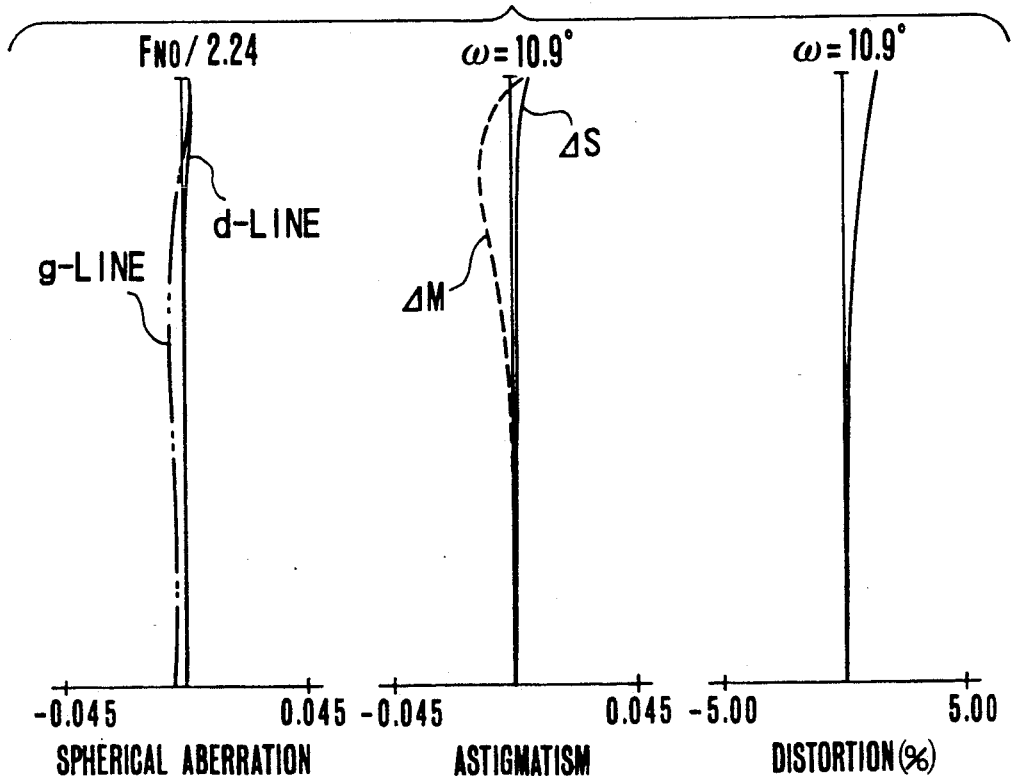
FIG. 16 is graphic representations of the various aberrations of the zoom lens shown in the numerical example 5 in an intermediate focal length position.
Figure 17:
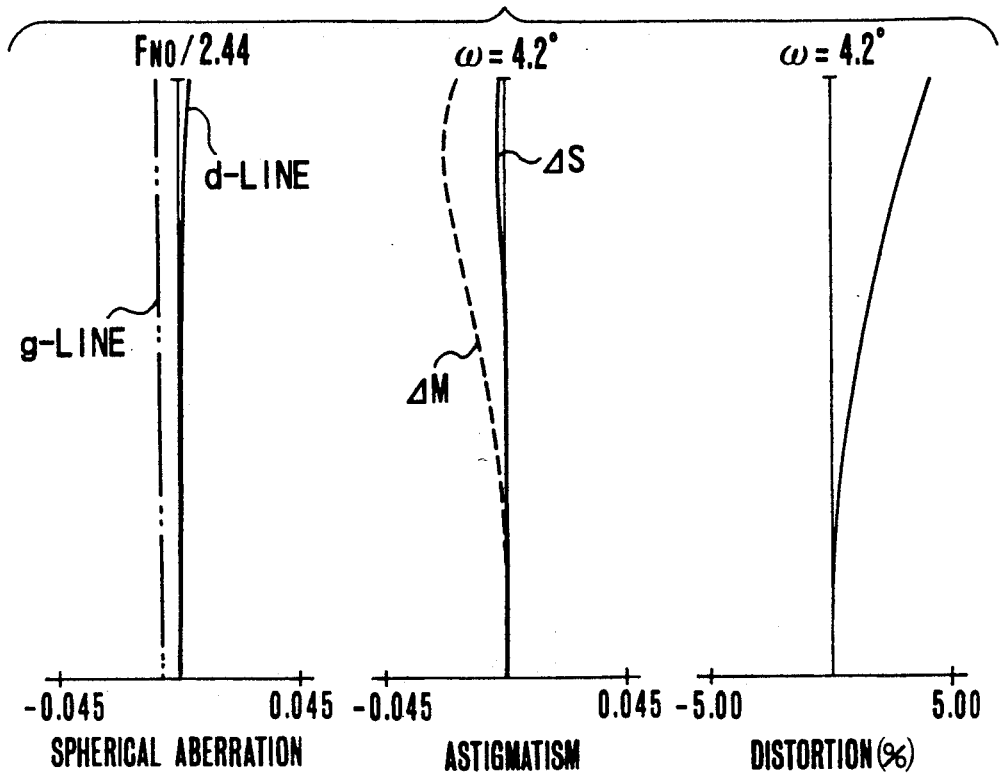
FIG. 17 is graphic representations of the various aberrations of the zoom lens shown in the numerical example 5 in the telephoto end.
Figure 18:
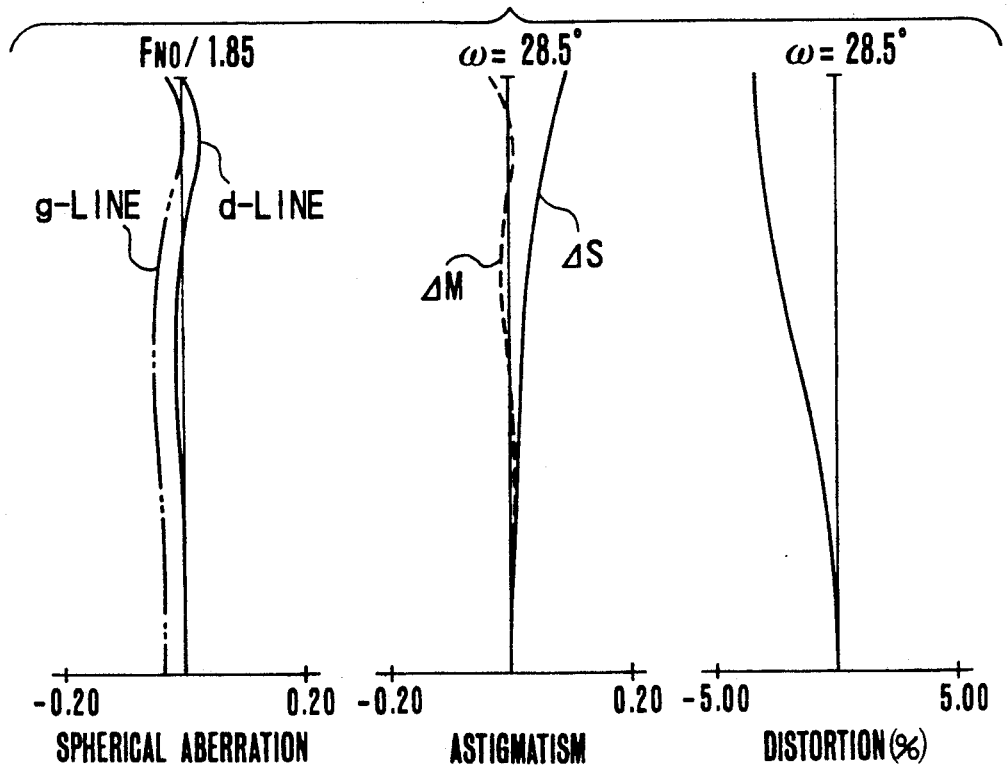
FIG. 18 is graphic representations of the various aberrations of a zoom lens, which is shown in a numerical example 6, in the wide-angle end.
Figure 19:
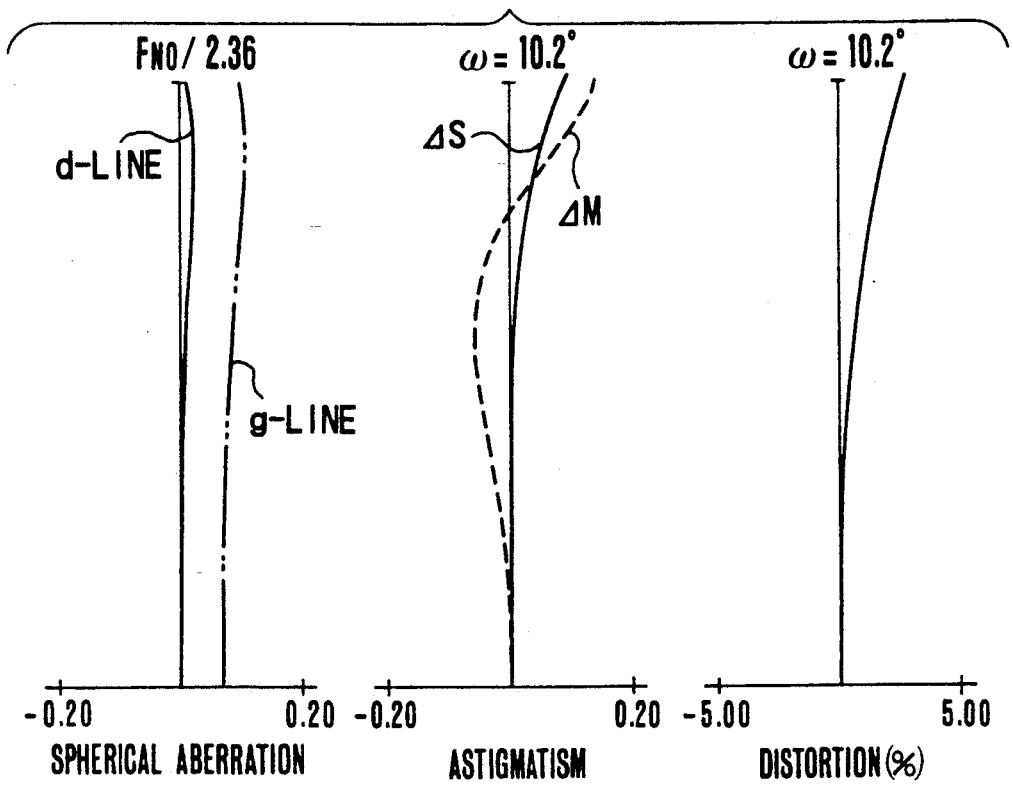
FIG. 19 is graphic representations of the various aberrations of the zoom lens shown in the numerical example 6 in an intermediate focal length position.
Figure 20:
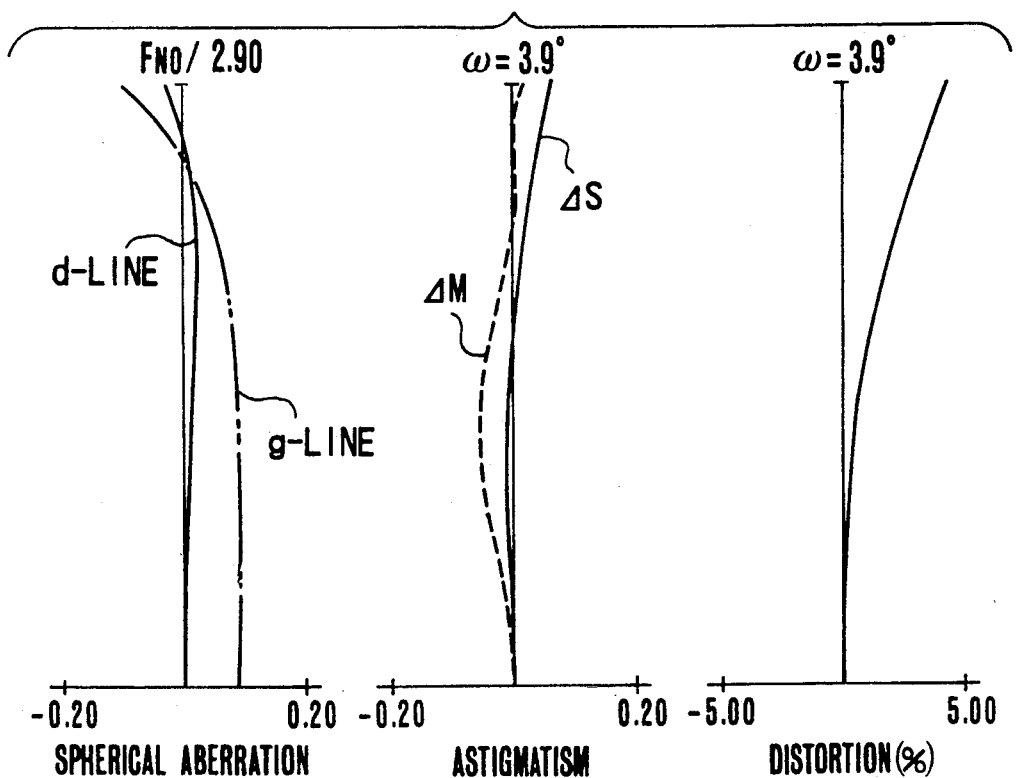
FIG. 20 is graphic representations of the various aberrations of the zoom lens shown in the numerical example 6 in the telephoto end.
Figure 21:
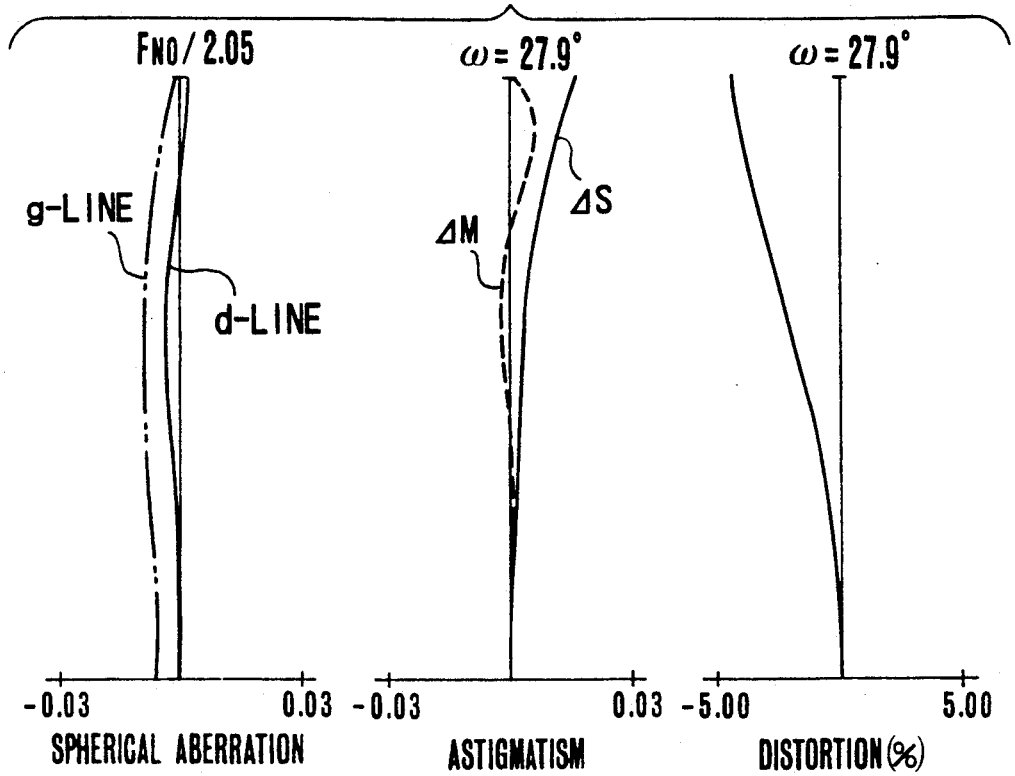
FIG. 21 is graphic representations of the various aberrations of a zoom lens, which is shown in a numerical example 7, in the wide-angle end.
Figure 22:
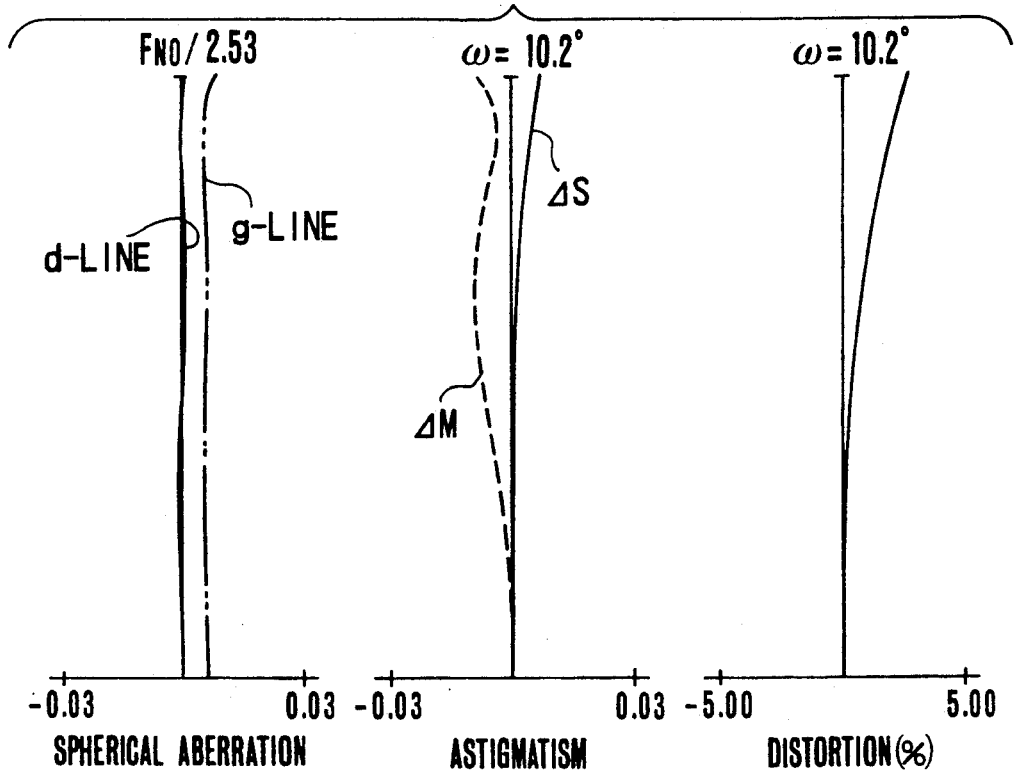
FIG. 22 is graphic representations of the various aberrations of the zoom lens shown in the numerical example 7 in an intermediate focal length position.
Figure 23:
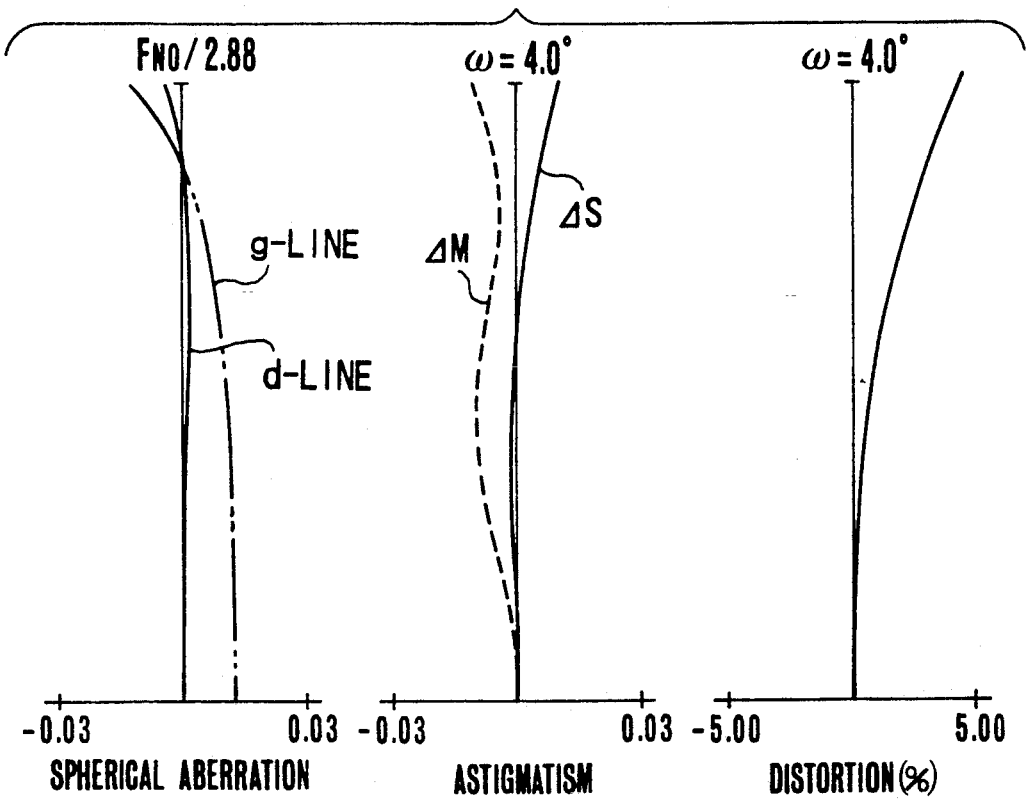
FIG. 23 is graphic representations of the various aberrations of the zoom lens shown in the numerical example 7 in the telephoto end.

FIG. 1 is a schematic diagram of an embodiment of a zoom lens of the rear focus type according to the invention.

In the figure, I denotes a first lens unit of positive refractive power, II a second lens unit of negative refractive power, III a third lens unit of positive refractive power, IV a fourth lens unit of positive refractive power, and V a fifth lens unit of negative refractive power. An aperture stop SP stands still in front of the third lens unit III.

When zooming from the wide-angle end to the telephoto end, the second lens unit is moved toward the image side as shown by an arrow, while the image shift with zooming is compensated for by moving the fourth lens unit.

Also, the fourth lens unit is moved along the optical axis to effect focusing, so that the rear focus type is employed. In FIG. 1, a solid line curve 4a and a dash line curve 4b show the loci of movement of the fourth lens unit for compensating for the image shift when zooming from the wide-angle end to the telephoto end while an infinitely distant object and a closest object are brought into focus, respectively.

It is to be noted that the first, third and fifth lens units remain stationary during zooming and focusing.

In the present embodiment, a provision for compensating for the image shift with zooming and another provision for focusing are made both in the fourth lens unit. In this regard, a particular feature is that, as shown by the curves 4a and 4b, the locus the fourth lens unit depicts when zooming from the wide-angle end to the telephoto end is made convex toward the object side. As this fact makes it possible to efficiently utilize the space between the third and fourth lens unit, a shortening of the total length of the entire lens system is advantageously achieved.

In the present embodiment, when focusing from an infinitely distant object to shorter object distances, for example, at the telephoto end, the fourth lens unit moves forward as shown by a straight line arrow 4c in FIG. 1.

In the present embodiment, the rear focus type as described above is employed to attain a more advantageous result of preventing the effective diameter of the first lens unit from increasing than with the conventional 4-unit zoom lens whose first lens unit is moved forward when performing focusing.

In addition, the aperture stop is disposed just before the third lens unit to lessen the variation of aberrations due to the movable lens units, and the spacings between those of the lens units which lie before the aperture stop are shortened, thereby making it easy to achieve the shortening of the diameter of the front lenses.

Yet another features are that, letting the focal length of the i-th lens unit be denoted by fi, and the magnification of the fifth lens unit with an object at infinity be denoted by $\beta_5$, these optical parameters are specified as follows:

$$1.25 < |f_5/f_3| < 2.1 \qquad (1)$$

$$1.09 < |\beta_5| < 1.45 \qquad (2)$$

When these conditions are satisfied a zoom lens of high range having good stability of optical performance throughout the entire zooming range and further throughout the focusing range can be realized.

The technical significance of each of the above-described conditions is explained below.

The inequalities of condition (1) are concerned with the ratio of the focal lengths of the third and fifth lens units and have an aim chiefly to retain the good optical performance while minimizing the overall length of a section of the third lens units and those that follow. When the refractive power of the fifth lens unit is too strong as exceeding the lower limit of the condition (1), the Petzval sum increases in the negative sense. So, it becomes difficult to correct curvature of field. Meanwhile, when the refractive power of the fifth lens unit is too weak as exceeding the upper limit, it becomes difficult to maintain the sufficient shortening of the total length of the entire lens system to be achieved.

The inequalities of condition (2) are concerned with the magnification of the fifth lens unit and have an aim to shorten the total length of the entire lens system, while still permitting the predetermined optical performance to be obtained. When the magnification of the fifth lens unit is smaller than the lower limit, it becomes difficult to achieve the shortening of the total length of the entire lens system. Meanwhile, when the magnification is larger than the upper limit, the form becomes advantageous for shortening the total length of the entire lens system, but, in some cases, it becomes difficult to secure a predetermined back focal distance. In other cases, as the distance between the exit pupil and the image plane shortens, or the telecentric property collapses considerably, this zoom lens becomes difficult to apply to the video camera.

The above-described conditions suffice for achieving the zoom lens of the invention. To get even better an optical performance, however, it is desirable to satisfy the following additional condition:

$$0.25 < |f_2/\sqrt{f_W \cdot f_T}| < 0.40 \tag{3}$$

where $f_2$ is the focal length of the second lens unit, and $f_T$ and $f_W$ are respectively the longest and shortest focal lengths of the entire lens system.

Further additional conditions are:

$$0.6 < f_3/f_4 < 1.0 \tag{4}$$

$$0.65 < D/f_W < 0.95 \tag{5}$$

where $f_3$ and $f_4$ are the focal lengths of the third and fourth lens units, respectively, and D is the air separation between the third and fourth lens units in the wide-angle end with an object at infinity.

The inequalities of condition (3) are concerned with the refractive power of the second lens unit and have an aim to obtain a predetermined zoom ratio advantageously with the limitation of the variation with zooming of aberrations to a minimum. When the refractive power of the second lens unit is too strong as exceeding the lower limit, it becomes easy to minimize the bulk and size of the entire lens system, but the Petzval sum increases in the negative sense, causing the curvature of field to increase, and the variation of aberrations with zooming comes to get greater. When the refractive power of the second lens unit is too weak as exceeding the upper limit, the variation of aberrations with zooming decreases, but the required amount of movement of the second lens for the predetermined zoom ratio increases, causing the total length of the entire lens system to elongate objectionably.

The inequalities of condition (4) are concerned with the refractive powers of the third and fourth lens units and have an aim to shorten the length of a section of the third lens unit and those that follow.

When the refractive power is too strong beyond the lower limit, it is advantageous for shortening the total length of the entire lens system, but either spherical aberration or coma becomes difficult to correct, or the back focal distance becomes difficult to secure. So, that is no good. When the refractive power of the third lens unit is too weak beyond the upper limit, an insufficient shortening of the total length of the entire lens system results.

The inequalities of condition (5) are concerned with the air separation between the third lens unit and the fourth lens unit and have an aim to shorten the length of a section from the stop to the image plane, while still permitting the good optical performance to be obtained. When the separation between the second and fourth lens units is shorter than the lower limit, it is advantageous for shortening the total length of the entire lens system, but spherical aberration becomes difficult to correct in a region from the wide-angle end to an intermediate focal length position. Conversely when the upper limit is exceeded, the length of that section is caused to insufficiently shorten.

As is further desirable, the following condition is satisfied:

$$0.80 < |\beta_{2T}/\sqrt{Z}| < 1.10 \tag{6}$$

where $\beta_{2T}$ is the magnification of the second lens unit in the telephoto end, and Z is the zoom ratio.

The inequalities of condition (6) are concerned with the magnification of the second lens unit in the telephoto end in terms of the zoom ratio. When the magnification is too small as exceeding the lower limit, the required amount of movement of the second lens unit for a predetermined zoom ratio gets larger, so that the total length of the entire lens system comes to increase. Conversely when the magnification is too large as exceeding the upper limit, the total length of the entire lens system can be shortened, but the locus of movement of the fourth lens unit takes a steep gradient as zooming nears the telephoto end with an object at infinity. Therefore, the load on the motor or like drive means therefore has to increase largely. So, it is no good.

Further, in a case where the aforesaid fifth lens unit is constructed with one negative lens, letting the refractive index of this negative lens be denoted by $N_{51}$, it is recommended to employ a glass material which satisfies the following condition:

$$N_{51} > 1.6$$

As desired, with regard to the magnification $\beta_5$ of the fifth lens unit with an object at infinity, the following condition may be set forth:

$$1.2 < \beta_5 < 1.6 \tag{7}$$

The significance of this condition is almost the same as that of the preceding condition (2).

Also, it is desirable to satisfy the following conditions:

$$0.25 < f_2/\sqrt{f_W \cdot f_T} < 0.37 \tag{8}$$

$$0.8 < f_5/f_3 < 2.1 \tag{9}$$

$$0.75 < \beta_{2T}/Z < 1.35 \tag{10}$$

$$0.5 < f_3/f_4 < 1.2 \tag{11}$$

where $f_i$ is the focal length of the i-th lens unit, $f_W$ and $f_T$ are respectively the shortest and longest focal lengths of the entire lens system, Z is the zoom ratio, and $\beta_{2T}$ is the magnification of the second lens unit in the telephoto end.

The significances of these conditions (8) to (11) are almost the same as those of the conditions (3), (1), (6) and (4), respectively.

Next, numerical examples of the invention are shown. In the numerical data for these examples, Ri is the radius of curvature of the i-th lens surface when counted from the object side, Di is the i-th lens thickness or air separation, and Ni and vi are respectively the refractive index and Abbe number of the glass of the i-th lens element.

Incidentally, in the numerical examples, there is an optical member in the form of a face plate or like glass block positioned at the last.

The shape of an aspheric surface is expressed in the coordinates with an X axis in the axial direction and an H axis in a direction perpendicular to the optical axis, the direction in which light advances being taken as position, by the following equation:

$$X = \frac{(1/R_0)H^2}{1 + \sqrt{1 - (1+K)(H/R_0)^2}} + BH^4 + CH^6 + DH^8 + EH^{10}$$

where $R_O$ is the radius of the osculating sphere, and K, B, C, D and E are the aspheric coefficients.

Numerical Example 1:

| F = 1-7.59 | FNO = 1:2.05-2.88 | 2ω = 52.4°-7.4° |
|---|---|---|

| | | | |
|---|---|---|---|
| R1 = 6.8187 | D1 = 0.1382 | N1 = 1.80518 | ν1 = 25.4 |
| R2 = 2.5436 | D2 = 0.5530 | N2 = 1.51633 | ν2 = 64.1 |
| R3 = −49.6668 | D3 = 0.0230 | | |
| R4 = 2.9388 | D4 = 0.4147 | N3 = 1.80400 | ν3 = 46.6 |
| R5 = 29.1846 | D5 = Variable | | |
| R6 = −12.8333 | D6 = 0.0768 | N4 = 1.88300 | ν4 = 40.8 |
| R7 = 0.9044 | D7 = 0.2611 | | |
| R8 = −1.3711 | D8 = 0.0768 | N5 = 1.51823 | ν5 = 59.0 |
| R9 = 1.317 | D9 = 0.2688 | N6 = 1.80518 | ν6 = 25.4 |
| R10 = −19.0808 | D10 = Variable | | |
| R11 = Stop | D11 = 0.15 | | |
| R12 = Aspheric | D12 = 0.4762 | N7 = 1.51633 | ν7 = 64.1 |
| R13 = −12.2173 | D13 = Variable | | |
| R14 = 1.9620 | D14 = 0.0922 | N8 = 1.84666 | ν8 = 23.8 |
| R15 = 0.9932 | D15 = 0.0230 | | |
| R16 = 1.0963 | D16 = 0.4608 | N9 = 1.62299 | ν9 = 58.1 |
| R17 = Aspheric | D17 = Variable | | |
| R18 = 9.2166 | D18 = 0.0768 | N10 = 1.78472 | ν10 = 25.7 |
| R19 = Aspheric | D19 = 0.4608 | | |
| R20 = ∞ | D20 = 0.8602 | N11 = 1.51633 | ν11 = 64.1 |
| R21 = ∞ | | | |

| Variable Separation | Focal Length | | |
|---|---|---|---|
| | 1.00 | 3.05 | 7.59 |
| D5 | 0.14 | 1.48 | 2.28 |
| D10 | 2.32 | 0.97 | 0.18 |
| D13 | 0.73 | 0.24 | 0.70 |
| D17 | 0.55 | 1.04 | 0.58 |

R12: Aspheric
$R_0 = 1.2832$  K = 0  B = $-6.8425 \times 10^{-2}$
$C = -2.0137 \times 10^{-2}$    D = $-1.1133 \times 10^{-2}$ R17: Aspheric
$R_0 = -4.1788$  K = 0  B = $2.6326 \times 10^{-2}$
$C = -3.4518 \times 10^{-1}$    D = $-5.9716 \times 10^{-2}$ R19: Aspheric
$R_0 = 2.4326$  K = 0  B = $4.1081 \times 10^{-2}$
$C = 5.2646 \times 10^{-2}$    D = $-1.1098$

Numerical Example 2:

| F = 1-7.59 | FNO = 1:2.05-2.88 | 2ω = 52.4°-7.4° |
|---|---|---|

| | | | |
|---|---|---|---|
| R1 = 7.1978 | D1 = 0.1382 | N1 = 1.80518 | ν1 = 25.4 |
| R2 = 2.5730 | D2 = 0.5530 | N2 = 1.51633 | ν2 = 64.1 |
| R3 = −25.9102 | D3 = 0.0230 | | |
| R4 = 2.8372 | D4 = 0.4147 | N3 = 1.80400 | ν3 = 46.6 |
| R5 = 23.1073 | D5 = Variable | | |
| R6 = −13.7908 | D6 = 0.0768 | N4 = 1.88300 | ν4 = 40.8 |
| R7 = 0.8774 | D7 = 0.2611 | | |
| R8 = −1.2666 | D8 = 0.0768 | N5 = 1.51823 | ν5 = 59.0 |
| R9 = 1.1383 | D9 = 0.2688 | N6 = 1.80518 | ν6 = 25.4 |
| R10 = −13.6177 | D10 = Variable | | |
| R11 = Stop | D11 = 0.15 | | |
| R12 = Aspheric | D12 = 0.4762 | N7 = 1.51633 | ν7 = 64.1 |
| R13 = −19.1290 | D13 = Variable | | |
| R14 = 1.7709 | D14 = 0.0922 | N8 = 1.84666 | ν8 = 23.8 |
| R15 = 0.9293 | D15 = 0.0230 | | |
| R16 = 1.0077 | D16 = 0.4608 | N9 = 1.62280 | ν9 = 57.1 |
| R17 = Aspheric | D17 = Variable | | |
| R18 = 8.3832 | D18 = 0.0768 | N10 = 1.76182 | ν10 = 26.5 |
| R19 = Aspheric | D19 = 0.4608 | | |
| R20 = ∞ | D20 = 0.8602 | N11 = 1.51633 | ν11 = 64.1 |
| R21 = ∞ | | | |

| Variable Separation | Focal Length | | |
|---|---|---|---|
| | 1.00 | 3.04 | 7.59 |
| D5 | 0.14 | 1.44 | 2.21 |
| D10 | 2.25 | 0.94 | 0.18 |
| D13 | 0.74 | 0.31 | 0.71 |
| D17 | 0.55 | 0.98 | 0.58 |

R12: Aspheric
$R_0 = 1.2741$  K = 0  B = $-6.7762 \times 10^{-2}$
$C = -1.8094 \times 10^{-2}$    D = $-1.4784 \times 10^{-2}$ R17: Aspheric
$R_0 = -4.0116$  K = 0  B = $3.3926 \times 10^{-2}$
$C = -1.6544 \times 10^{-2}$    D = $-1.3663 \times 10^{-1}$ R19: Aspheric
$R_0 = 1.9874$  K = 0  B = $4.8186 \times 10^{-2}$
$C = 4.7864 \times 10^{-1}$    D = $-9.3176 \times 10^{-1}$

Numerical Example 3:

| F = 1-9.53 | FNO = 1:2.05-2.88 | 2ω = 56.1°-6.4° |
|---|---|---|

| | | | |
|---|---|---|---|
| R1 = 11.7609 | D1 = 0.1667 | N1 = 1.80518 | ν1 = 25.4 |
| R2 = 3.4650 | D2 = 0.7000 | N2 = 1.51633 | ν2 = 64.1 |
| R3 = −11.9230 | D3 = 0.0250 | | |
| R4 = 3.3579 | D4 = 0.4833 | N3 = 1.80400 | ν3 = 46.6 |
| R5 = 16.7964 | D5 = Variable | | |
| R6 = −20.0341 | D6 = 0.0833 | N4 = 1.88300 | ν4 = 40.8 |
| R7 = 0.9854 | D7 = 0.3250 | | |
| R8 = −1.3991 | D8 = 0.0833 | N5 = 1.51633 | ν5 = 64.1 |
| R9 = 1.2929 | D9 = 0.3333 | N6 = 1.80518 | ν6 = 25.4 |
| R10 = −29.4646 | D10 = Variable | | |
| R11 = Stop | D11 = 0.17 | | |
| R12 = Aspheric | D12 = 0.5000 | N7 = 1.60311 | ν7 = 60.7 |
| R13 = −2002.8352 | D13 = Variable | | |
| R14 = 2.4110 | D14 = 0.0833 | N8 = 1.84666 | ν8 = 23.8 |
| R15 = 1.0944 | D15 = 0.0417 | | |
| R16 = 1.1801 | D16 = 0.5167 | N9 = 1.62280 | ν9 = 57.1 |
| R17 = Aspheric | D17 = Variable | | |
| R18 = −13.3299 | D18 = 0.0833 | N10 = 1.78472 | ν10 = 25.7 |
| R19 = Aspheric | D19 = 0.5000 | | |
| R20 = ∞ | D20 = 0.9333 | N11 = 1.51633 | ν11 = 64.1 |
| R21 = ∞ | | | |

| Variable Separation | Focal Length | | |
|---|---|---|---|
| | 1.00 | 3.29 | 9.53 |
| D5 | 0.18 | 1.84 | 2.81 |
| D10 | 2.86 | 1.20 | 0.23 |
| D13 | 0.87 | 0.23 | 0.72 |
| D17 | 0.53 | 1.17 | 0.68 |

R12: Aspheric
$R_0 = 1.4549$  K = 0  B = $-4.0712 \times 10^{-2}$
$C = -1.0583 \times 10^{-2}$    D = $-3.7825 \times 10^{-3}$ R17: Aspheric
$R_0 = -3.9983$  K = 0  B = $3.4487 \times 10^{-2}$
$C = -2.3943 \times 10^{-2}$    D = $-1.0809 \times 10^{-2}$ R19: Aspheric
$R_0 = 4.2377$  K = 0  B = $3.2360 \times 10^{-2}$ -continued

Numerical Example 3:

$C = 4.1248 \times 10^{-1}$    $D = -7.2591 \times 10^{-1}$

Numerical Example 4:

| F = 1–7.60 | FNO = 1:2.05–2.88 | $2\omega$ = 54.1°–7.7° |
|---|---|---|

| R1 = 11.6969 | D1 = 0.1458 | N1 = 1.80518 | $\nu1$ = 25.4 |
| R2 = 3.1061 | D2 = 0.7500 | N2 = 1.51633 | $\nu2$ = 64.2 |
| R3 = −7.3160 | D3 = 0.0417 | | |
| R4 = 2.5628 | D4 = 0.4792 | N3 = 1.80400 | $\nu3$ = 46.6 |
| R5 = 8.7600 | D5 = Variable | | |
| R6 = −11.4642 | D6 = 0.1042 | N4 = 1.88300 | $\nu4$ = 40.8 |
| R7 = 0.9060 | D7 = 0.3063 | | |
| R8 = −1.4866 | D8 = 0.1042 | N5 = 1.51742 | $\nu5$ = 52.4 |
| R9 = 1.1562 | D9 = 0.3750 | N6 = 1.84666 | $\nu6$ = 23.8 |
| R10 = 8.9788 | D10 = Variable | | |
| R11 = Stop | D11 = 0.21 | | |
| R12 = Aspheric | D12 = 0.5833 | N7 = 1.58913 | $\nu7$ = 61.2 |
| R13 = 47.7583 | D13 = Variable | | |
| R14 = 1.6104 | D14 = 0.1042 | N8 = 1.84666 | $\nu8$ = 23.8 |
| R15 = 0.8966 | D15 = 0.0250 | | |
| R16 = 0.9568 | D16 = 0.7500 | N9 = 1.58913 | $\nu9$ = 61.2 |
| R17 = Aspheric | D17 = Variable | | |
| R18 = −3.8473 | D18 = 0.1042 | N10 = 1.80610 | $\nu10$ = 33.3 |
| R19 = Aspheric | D19 = 0.4792 | | |
| R20 = ∞ | D20 = 0.8333 | N11 = 1.51633 | $\nu11$ = 64.2 |
| R21 = ∞ | | | |

| Variable Separation | Focal Length | | |
|---|---|---|---|
| | 1.00 | 2.90 | 7.60 |
| D5 | 0.21 | 1.39 | 2.09 |
| D10 | 2.15 | 0.96 | 0.27 |
| D13 | 0.58 | 0.28 | 0.60 |
| D17 | 0.41 | 0.72 | 0.40 |

R12: Aspheric
$R_0 = 1.2926$    $K = -8.54160D-02$
$B = -6.33017D-02$    $C = 1.31009D-03$
$D = -1.14630D-02$    $E = -4.31135D-03$ R17: Aspheric
$R_0 = -2.5346$    $K = -1.79415D-01$
$B = 1.07052D-01$    $C = -1.70166D-01$
$D = 3.90950D-01$    $E = -7.38947D-01$ R19: Aspheric
$R_0 = 3.2822$    $K = -5.51414D-01$
$B = -6.39075D-02$    $C = 7.21340D-01$
$D = -7.82600D-01$    $E = -1.20795D+00$

Numerical Example 5:

| F = 1–7.61 | FNO = 1:1.85–2.44 | $2\omega$ = 58.2°–8.4° |
|---|---|---|

| R1 = 9.7640 | D1 = 0.1591 | N1 = 1.80518 | $\nu1$ = 25.4 |
| R2 = 3.4150 | D2 = 1.2599 | N2 = 1.51633 | $\nu2$ = 64.2 |
| R3 = −9.5968 | D3 = 0.0455 | | |
| R4 = 2.8931 | D4 = 0.6386 | N3 = 1.71700 | $\nu3$ = 47.9 |
| R5 = 12.0058 | D5 = Variable | | |
| R6 = 32.1620 | D6 = 0.1136 | N4 = 1.88300 | $\nu4$ = 40.8 |
| R7 = 1.1959 | D7 = 0.3864 | | |
| R8 = −1.3785 | D8 = 0.1136 | N5 = 1.75500 | $\nu5$ = 52.3 |
| R9 = 1.5679 | D9 = 0.4091 | N6 = 1.84666 | $\nu6$ = 23.8 |
| R10 = −8.4546 | D10 = Variable | | |
| R11 = Stop | D11 = 0.22 | | |
| R12 = Aspheric | D12 = 0.6364 | N7 = 1.58313 | $\nu7$ = 59.4 |
| R13 = 32.2310 | D13 = Variable | | |
| R14 = 1.7561 | D14 = 0.1136 | N8 = 1.84666 | $\nu8$ = 23.8 |
| R15 = 0.9631 | D15 = 0.0797 | | |
| R16 = Aspheric | D16 = 0.7410 | N9 = 1.58313 | $\nu9$ = 59.4 |
| R17 = Aspheric | D17 = Variable | | |
| R18 = −2.4287 | D18 = 0.1136 | N10 = 1.75520 | $\nu10$ = 27.5 |
| R19 = −8.8317 | D19 = 0.4545 | | |
| R20 = ∞ | D20 = 0.9091 | N11 = 1.51633 | $\nu11$ = 64.2 |
| R21 = ∞ | | | |

| Variable Separation | Focal Length | | |
|---|---|---|---|
| | 1.00 | 2.89 | 7.61 |
| D5 | 0.22 | 1.51 | 2.27 |
| D10 | 2.37 | 1.07 | 0.31 |
| D13 | 0.65 | 0.29 | 0.67 |
| D17 | 0.51 | 0.87 | 0.49 |

R12: Aspheric
$R_0 = 1.4025$    $K = -3.27070D-02$
$B = -4.08191D-02$    $C = -1.44857D-02$
$D = -5.38920D-03$    $E = -5.40381D-04$ R16: Aspheric
$R_0 = 1.1258$    $K = -1.48980D-01$
$B = -2.28095D-02$    $C = -9.71976D-03$
$D = 9.85460D-02$    $E = 2.30539D-03$ R17: Aspheric
$R_0 = -2.4231$    $K = 3.09224D+00$
$B = 2.55640D-02$    $C = -7.38614D-02$
$D = 2.85616D-01$    $E = -3.85806D-01$

Numerical Example 6:

| F = 1–7.88 | FNO = 1:1.85–2.90 | $2\omega$ = 56.9°–7.9° |
|---|---|---|

| R1 = 7.4359 | D1 = 0.1525 | N1 = 1.84666 | $\nu1$ = 23.8 |
| R2 = 2.5787 | D2 = 0.6998 | N2 = 1.51742 | $\nu2$ = 52.4 |
| R3 = −16.3638 | D3 = 0.0254 | | |
| R4 = 2.6694 | D4 = 0.5305 | N3 = 1.74400 | $\nu3$ = 44.8 |
| R5 = 22.3433 | D5 = Variable | | |
| R6 = 22.3901 | D6 = 0.0847 | N4 = 1.88300 | $\nu4$ = 40.8 |
| R7 = 0.8133 | D7 = 0.3644 | | |
| R8 = −1.3274 | D8 = 0.0847 | N5 = 1.51742 | $\nu5$ = 52.4 |
| R9 = 1.1738 | D9 = 0.2966 | N6 = 1.84666 | $\nu6$ = 23.8 |
| R10 = 64.5759 | D10 = Variable | | |
| R11 = Stop | D11 = 0.19 | | |
| R12 = Aspheric | D12 = 0.6017 | N7 = 1.58313 | $\nu7$ = 59.4 |
| R13 = −21.2964 | D13 = variable | | |
| R14 = 1.7851 | D14 = 0.0847 | N8 = 1.84666 | $\nu8$ = 23.8 |
| R15 = 0.8965 | D15 = 0.6872 | N9 = 1.58313 | $\nu9$ = 59.4 |
| R16 = Aspheric | D16 = Variable | | |
| R17 = −4.0195 | D17 = 0.1017 | N10 = 1.81474 | $\nu10$ = 37.0 |
| R18 = Aspheric | D18 = 0.5085 | | |
| R19 = ∞ | D19 = 0.8983 | N11 = 1.51633 | $\nu11$ = 64.2 |
| R20 = ∞ | | | |

| Variable Separation | Focal Length | | |
|---|---|---|---|
| | 1.00 | 3.01 | 7.88 |
| D5 | 0.14 | 1.43 | 2.19 |
| D10 | 2.29 | 1.00 | 0.24 |
| D13 | 0.77 | 0.34 | 0.77 |
| D16 | 0.44 | 0.88 | 0.44 |

R12: Aspheric
$R_0 = 1.47091D+00$    $K = 0.00000D+00$
$B = -4.61479D-02$    $C = -6.13609D-03$
$D = -5.11440D-03$    $E = 0.00000D+00$ R16: Aspheric
$R_0 = -3.68405D+00$    $K = 0.00000D+00$
$B = 5.95094D-02$    $C = -3.14558D-02$
$D = -1.60938D-02$    $E = 0.00000D+00$ R18: Aspheric
$R_0 = 1.43067D+01$    $K = 0.00000D+00$
$B = -1.00030D-02$    $C = 3.28280D-01$
$D = -5.58150D-01$    $E = 0.00000D+00$ Numerical Example 7:

| F = 1-7.54 | FNO = 1:2.05-2.88 | 2ω = 55.8°-8.0° | |
|---|---|---|---|
| R1 = 9.8690 | D1 = 0.1488 | N1 = 1.80518 | ν1 = 25.4 |
| R2 = 2.8100 | D2 = 0.6364 | N2 = 1.51633 | ν2 = 64.2 |
| R3 = −9.2781 | D3 = 0.0331 | | |
| R4 = 2.5650 | D4 = 0.4298 | N3 = 1.80400 | ν3 = 46.6 |
| R5 = 11.1441 | D5 = Variable | | |
| R6 = −18.9651 | D6 = 0.0826 | N4 = 1.88300 | ν4 = 40.8 |
| R7 = 0.8429 | D7 = 0.3192 | | |
| R8 = −1.4720 | D8 = 0.0826 | N5 = 1.51742 | ν5 = 52.4 |
| R9 = 1.1074 | D9 = 0.2893 | N6 = 1.84666 | ν6 = 23.8 |
| R10 = 17.5299 | D10 = Variable | | |
| R11 = Stop | D11 = 0.17 | | |
| R12 = Aspheric | D12 = 0.4793 | N7 = 1.58913 | ν7 = 61.2 |
| R13 = −106.5600 | D13 = Variable | | |
| R14 = 1.5714 | D14 = 0.0826 | N8 = 1.84666 | ν8 = 23.8 |
| R15 = 0.8573 | D15 = 0.0264 | | |
| R16 = 0.9262 | D16 = 0.5455 | N9 = 1.58913 | ν9 = 61.2 |
| R17 = Aspheric | D17 = Variable | | |
| R18 = −5.1552 | D18 = 0.0992 | N10 = 1.80610 | ν10 = 33.3 |
| R19 = Aspheric | D19 = 0.4959 | | |
| R20 = ∞ | D20 = 0.8760 | N11 = 1.51633 | ν11 = 64.2 |
| R21 = ∞ | | | |

| Variable Separation | Focal Length | | |
|---|---|---|---|
| | 1.00 | 2.94 | 7.54 |
| D 5 | 0.19 | 1.39 | 2.10 |
| D10 | 2.18 | 0.98 | 0.27 |
| D13 | 0.76 | 0.39 | 0.85 |
| D17 | 0.43 | 0.80 | 0.33 |

R12: Aspheric $R_0 = 1.34970D+00$   $K = 0.00000D+00$
$B = -5.42644D-02$   $C = -1.09067D-02$
$D = -1.08029D-02$ R17: Aspheric $R_0 = -3.56258D+00$   $K = 0.00000D+00$
$B = 3.69499D-02$   $C = -4.11997D-02$
$D = -1.89899D-01$ R19: Aspheric $R_0 = 6.52315D+00$   $K = 0.00000D+00$
$B = 5.08881D-03$   $C = 3.56197D-01$
$D = -7.07432D-01$ According to the invention, by setting forth the above-described conditions for the refractive powers of the five lens units and for the zooming movements of the second and fourth lens units and by employing the lens configuration that moves the fourth lens unit when focusing, it is made possible to achieve a zoom lens of the rear focus type which has its zoom ratio increased to 8 to 10, or thereabout in such a manner that the bulk and size of the entire lens system is minimized and good correction of aberrations is maintained throughout the entire zooming range, and has a large relative aperture of 2.0 in F-number, and good stability of aberrations against focusing for a high optical performance.

What is claimed is:

1. A zoom lens comprising: in the order from an object side,
   a first lens unit having a positive refractive power;
   a second lens unit having a negative refractive power;
   a third lens unit having a positive refractive power;
   a fourth lens unit having a positive refractive power; and
   a fifth lens unit having a negative refractive power,
   wherein zooming from a wide-angle end to a telephoto end is performed by moving said second lens unit and said fourth lens unit, and
   wherein said zoom lens satisfies the following condition:

$$1.09 < \beta_5 < 1.45$$

wherein $\beta_5$ is the lateral magnification of said fifth lens unit with an object at infinity.

2. A zoom lens according to claim 1, wherein focusing is performed by moving said fourth lens unit.

3. A zoom lens according to claim 1, satisfying the following conditions:

$$0.8 < |f_5/f_3| < 2.1$$

where $f_3$ and $f_5$ are the focal lengths of said third and fifth lens units, respectively.

4. A zoom lens according to claim 3, satisfying the following condition:

$$0.25 < |f_2/\sqrt{f_W \cdot f_T}| < 0.40$$

where $f_2$ is the focal length of said second lens unit, and $f_W$ and $f_T$ are the shortest and longest focal lengths of the entire lens system, respectively.

5. A zoom lens according to claim 1, satisfying the following condition:

$$N_{51} > 1.6$$

where $N_{51}$ is the refractive index of said fifth lens unit.

6. A zoom lens according to claim 1, satisfying the following condition:

$$0.5 < f_3/f_4 < 1.2$$

where $f_i$ is the focal length of the i-th lens unit.

7. A zoom lens comprising, in the order from an object side,
   a first lens unit having a positive refractive power;
   a second lens unit having a negative refractive power;
   a third lens unit having a positive refractive power;
   a fourth lens unit having a positive refractive power; and
   a fifth lens unit having a negative refractive power,
   wherein zooming from a wide-angle end to a telephoto end is performed by moving said second lens unit and said fourth lens unit, and
   wherein said first lens unit, said third lens unit and said fifth lens nit are stationary, and
   wherein said zoom lens satisfies the following conditions:

$$0.8 < |f_5/f_3| < 2.1$$

where $f_3$ and $f_5$ are the focal lengths of said third and fifth lens units, respectively.

8. A zoom lens according to claim 7, wherein focusing is performed by moving said fourth lens unit.

9. A zoom lens according to claim 7 satisfying the following conditions:

$$1.09 < \beta_5 < 1.45$$

where $\beta_5$ is the lateral magnification of said fifth lens unit with an object at infinity.

10. A zoom lens according to claim 7, satisfying the following condition:

$$0.25 < |f_2/\sqrt{f_W \cdot f_T}| < 0.40$$

where $f_2$ is the focal length of said second lens unit, and $f_W$ and $f_T$ are the shortest and longest focal lengths of the entire lens system, respectively.

11. A zoom lens according to claim 7, satisfying the following conditions:

$$N_{51} < 1.6$$

where $N_{51}$ is the refractive index of said fifth lens unit.

12. A zoom lens comprising, in the order from an object side, a first lens unit having a positive refractive power;
a second lens unit having a negative refractive power;
a third lens unit having a positive refractive power;
a fourth lens unit having a positive refractive power; and
a fifth lens unit having a negative refractive power,
wherein zooming from a wide-angle end to a telephoto end is performed by moving said second lens unit and said fourth lens unit, and
wherein said first lens unit, said third lens unit and said fifth lens unit are stationary, and
wherein said zoom lens satisfies the following condition:

$$0.5 < f_3/f_4 < 1.2$$

where $f_i$ is the focal length of the i-th lens unit.

* * * * *

UNITED STATES PATENT AND TRADEMARK OFFICE
CERTIFICATE OF CORRECTION

PATENT NO. : 5,299,064
DATED : HIROYUKI HAMANO, ET AL.
INVENTOR(S) : March 29, 1994

It is certified that error appears in the above-indentified patent and that said Letters Patent is hereby corrected as shown below:

<u>COVER PAGE</u>
 At [56], "606914 1/1983 Japan" should read --60-6914 1/1983 Japan--.

<u>COLUMN 1</u>
 Line 8, "he" should read --the--.
 Line 24, "generally" should read --general--.
 Line 54, "another" should read --other--.

<u>COLUMN 2</u>
 Line 28, "irs" should read --first--.
 Line 32, "power power," should read --power,--.

<u>COLUMN 4</u>
 Line 29, "another" should read --other--.

<u>COLUMN 5</u>
 Line 8, "even better an" should read --an even better--.

<u>COLUMN 6</u>
 Line 67, "vi" should read --$\nu$i--.

<u>COLUMN 7</u>
 At Numerical Example 1, under "R17:Aspheric", "B=2.6326 x 10-2" should read --B=2.6326 x $10^{-2}$--.

<u>COLUMN 12</u>
 Line 37, "fi" should read --$f_i$--.
 Line 50, "nit" should read --unit--.
 Line 60, "claim 7" should read --claim 7,--.
 Line 61, "conditions:" should read --condition:--.

UNITED STATES PATENT AND TRADEMARK OFFICE
CERTIFICATE OF CORRECTION

PATENT NO. : 5,299,064
DATED : HIROYUKI HAMANO, ET AL.
INVENTOR(S) : March 29, 1994

It is certified that error appears in the above-indentified patent and that said Letters Patent is hereby corrected as shown below:

COLUMN 13
    Line 9, "conditions:" should read --condition:--.

COLUMN 14
    Line 16, "if" should read --$f_i$--.

Signed and Sealed this

Twentieth Day of September, 1994

Attest:

BRUCE LEHMAN

*Attesting Officer*         *Commissioner of Patents and Trademarks*